(12) United States Patent
Protassov et al.

(10) Patent No.: US 8,250,183 B1
(45) Date of Patent: *Aug. 21, 2012

(54) SYSTEM AND METHOD FOR PRE-INSTALLING OF VIRTUAL SERVER FILES

(75) Inventors: Stanislav S. Protassov, Moscow (RU); Alexander G. Tormasov, Moscow (RU); Serguei M. Beloussov, Singapore (SG)

(73) Assignee: Parallels IP Holdings GmbH, Schaffhausen (CH)

( * ) Notice: Subject to any disclaimer, the term of this patent is extended or adjusted under 35 U.S.C. 154(b) by 66 days.

This patent is subject to a terminal disclaimer.

(21) Appl. No.: 13/020,986

(22) Filed: Feb. 4, 2011

Related U.S. Application Data

(63) Continuation of application No. 11/264,100, filed on Nov. 2, 2005, now Pat. No. 7,890,605, which is a continuation-in-part of application No. 10/837,757, filed on May 4, 2004, now Pat. No. 7,461,144, which is a continuation-in-part of application No. 10/703,594, filed on Nov. 10, 2003, now Pat. No. 7,461,148, which is a continuation-in-part of application No. 09/918,031, filed on Jul. 30, 2001, now Pat. No. 7,099,948.

(60) Provisional application No. 60/269,655, filed on Feb. 16, 2001.

(51) Int. Cl.
G06F 15/16 (2006.01)
(52) U.S. Cl. .............. 709/219; 709/223; 718/1
(58) Field of Classification Search ............ 709/219
See application file for complete search history.

(56) References Cited

U.S. PATENT DOCUMENTS

| | | | |
|---|---|---|---|
| 6,075,938 A | 6/2000 | Bugnion et al. | |
| 6,779,016 B1 * | 8/2004 | Aziz et al. | 709/201 |
| 7,219,354 B1 | 5/2007 | Huang et al. | |
| 7,412,702 B1 | 8/2008 | Nelson et al. | |
| 2004/0221290 A1 * | 11/2004 | Casey et al. | 718/104 |
| 2005/0021713 A1 | 1/2005 | Dugan et al. | |
| 2008/0077648 A1 * | 3/2008 | Lam et al. | 709/201 |

OTHER PUBLICATIONS

Virtuozzo 2.5.1 user's guide (2003). cited by other.

* cited by examiner

*Primary Examiner* — Sulaiman Nooristany
(74) *Attorney, Agent, or Firm* — Bardmesser Law Group

(57) ABSTRACT

A system, method and computer program product for launching a plurality of active virtual servers in a computing system, including as a background process, generating a plurality of inactive virtual servers, wherein data related to the inactive virtual server comprises a set of private files and a set of common files used by multiple virtual servers, that are required for the virtual server to function and each of which is stored in its own dedicated container; setting up a disk image and a mount point associated with a particular virtual server, the mount point required for activating a functional virtual server, the disk image including any blank areas, implemented by a system administrator during activation of the virtual server, for each inactive virtual server on a storage device of the computing system, and copying files associated with each inactive virtual server to the disk image, wherein the inactive virtual servers are not associated with any owner; upon request from a user for a virtual server, activating one of the inactive virtual servers using the dedicated container by associating the activated virtual server with an owner; and configuring the activated virtual server based on user parameters, wherein a process of one virtual server only runs in that virtual server, and no other virtual server.

14 Claims, 5 Drawing Sheets

SYSTEM AND METHOD FOR PRE-INSTALLING OF VIRTUAL SERVER FILES

CROSS-REFERENCE TO RELATED APPLICATIONS

This application is a continuation of U.S. patent application Ser. No. 11/264,100, filed on Nov. 2, 2005, which is a continuation in part of U.S. patent application Ser. No. 10/837,757, entitled Virtual Private Server with Enhanced Security, filed on May 24, 2004, which is a continuation-in-part of U.S. patent application Ser. No. 10/703,594, filed on Nov. 10, 2003, which is a continuation-in-part of U.S. patent application Ser. No. 09/918,031, filed on Jul. 30, 2001, which claims priority to U.S. Provisional Patent Application No. 60/269,655, filed on Feb. 16, 2001, which are all incorporated by reference herein.

BACKGROUND OF THE INVENTION

1. Field of the Invention

This invention relates to a method and system for pre-installation of Virtual Private Servers in a data center or on a hardware server.

2. Description of the Related Art

Commercial hosting services are often provided by an Internet Service Provider (ISP), which generally provides a separate physical host computer for each customer on which to execute a server application. However, a customer purchasing hosting services will often neither require nor be amenable to paying for use of an entire host computer. In general, an individual customer will only require a fraction of the processing power, storage, and other resources of a host computer.

Accordingly, hosting multiple server applications on a single physical computer is desirable. In order to be commercially viable, however, every server application needs to be isolated from every other server application running on the same physical host. In that context, a single computer system (usually called a "host") supports multiple virtual servers (e.g., Virtual Private Servers or VPSs), sometimes as many as hundreds or thousands of VPSs.

One of the primary benefits of using VPSs is the low cost of providing services, which does not require dedicating actual physical hardware to each user. Therefore, the ability to rapidly provide a new VPS to a user is a commercial advantage, given a substantial need in the marketplace for such services. Even though creating a VPS takes considerably less time than installation and configuration of a hardware server, nonetheless, the process of VPS creation on a hardware server that is already in use can require an interruption of service (thus, affecting other users), or consuming the resources of the hardware to a point where other users are affected, or effectively interrupting functionality of the hardware server, from the perspective of other users of that hardware server.

Accordingly, a mechanism is needed that provides for VPS creation without affecting the level of service provided to other users of the hardware server.

Many applications involving such virtualization concepts as Virtual Private Servers (VPS) involve the use of VPSs in the context of webservers. Such a VPS therefore has an assigned IP address, and various other parameters associated with a webserver, for example, a URL, a DNS name, etc.

A typical situation where VPSs can be used is a single "box" (in other words, a single computer) located in a data center has a host operating system a plurality of VPSs (VPS 1, VPS 2, VPS 3, etc.), each of which appears to the user as a single dedicated webserver. The user is therefore unaware that the VPS is something other than an entire "box" dedicated to that particular user.

One of the problems in modern Virtual Private Server development is the sheer volume of the files and data required to support a typical VPS. Currently, the total volume of a disk drive partition typically allocated to each VPS is on the order of several hundred megabytes, and sometimes several gigabytes, of disk space. This does not include any user application files—this only represents the files that are required by the VPS itself to function.

A common situation that occurs with a Virtual Private Server is that new Virtual Private Servers need to be created with some frequency. For example a user might want to dedicate a particular Virtual Private Server to handling a specific URL, or a particular IP address, in addition to other Virtual Private Servers that user already owns. Alternatively, with VPS technology rapidly improving, and web hosting costs falling, ordinary users of the Internet are launching their own web sites. Each such web site can require a dedicated Virtual Private Server. Thus, the problem of creation of a new Virtual Private Server is a relatively routine task for a data center or a web hosting provider.

One of the problems that exist in the creation of a new Virtual Private Server is the length of time that the various operations for setting up the VPS require. A typical Virtual Private Server can have thousands (or even tens of thousands) of files that need to be copied to some dedicated storage space, disk partition, dedicated network drive or portion of a network drive, etc. The large number of files that have to be copied means that the copy process can be time consuming, on the order of many seconds, or even many minutes (or in some cases tens of minutes). Furthermore, the process of copying of the files can consume a significant share of network bandwidth (if the copying of the VPS files is done over a network). Alternatively, even if the copying is done from and to the same physical hard drive, the bandwidth the particular peripheral device may be used up to a point where the physical computer (which also handles many other tasks) is either unable to do so in a practical manner, or the speed with which it performs its other tasks is degraded.

Also, the disk space required for VPS files can be on the order of several gigabytes, which, given finite network and device bandwidth, can mean many minutes of copy time.

Thus, many hosting or data centers provide the users with relatively easy tools to set up their own VPS, particularly for web hosting. Essentially, the user can log into the provider's site, configure the VPS in a configuration that he desires, press "enter," and the hosting provider will, at some point down the road, provide a configured VPS for the user.

In other words, the problem is two-fold: either the process of creating the VPS takes a relatively long time (such that many users might think that the process has failed, given that many users are accustomed to nearly instantaneous response from Internet entities, or the process is so resource intensive that nothing else is effectively done while the particular VPS requested by the user is created.

In fact, depending on system load, process requirements, bandwidth of the network and the peripheral devices, the process of creating a VPS can take even tens of minutes, and perhaps even hours.

In other words, what is needed is a system and method for a user to press a "button" on his web browser to "create" a VPS, and the entire process is relatively rapid and interactive, taking no more than a couple of minutes, or, even preferably, on the order of 10-20 seconds.

SUMMARY OF THE INVENTION

Accordingly, the present invention is related to a system and method for pre-installing of Virtual Private Servers that substantially obviates one or more of the disadvantages of the related art.

In one aspect of the invention, there is provided a system, method and computer program product for managing Virtual Private Servers, including launching a plurality of active Virtual Private Servers (VPSs) in user space of a computing system; generating a plurality of inactive VPSs, wherein data related to the inactive VPS comprises a set of files and links stored in a dedicated container; upon request from a user for a VPS, activating one of the inactive VPSs using the dedicated container; and configuring the activated VPS based on user parameters.

The configuring step can include configuring any of URL names, IP addresses, passwords, resource allocations, DNS names, hostnames, VPS administrative functions, and VPS user password. The generating step optionally runs as a background process, or at a time of low system load. The generating step can include generating a plurality of inactive VPSs of any of mail server, web server, database server, FTP server, and game server. The generating step can also setting up a disk partition for each inactive VPS, and copying files associated with each inactive VPS that is being pre-installed to the disk partition.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
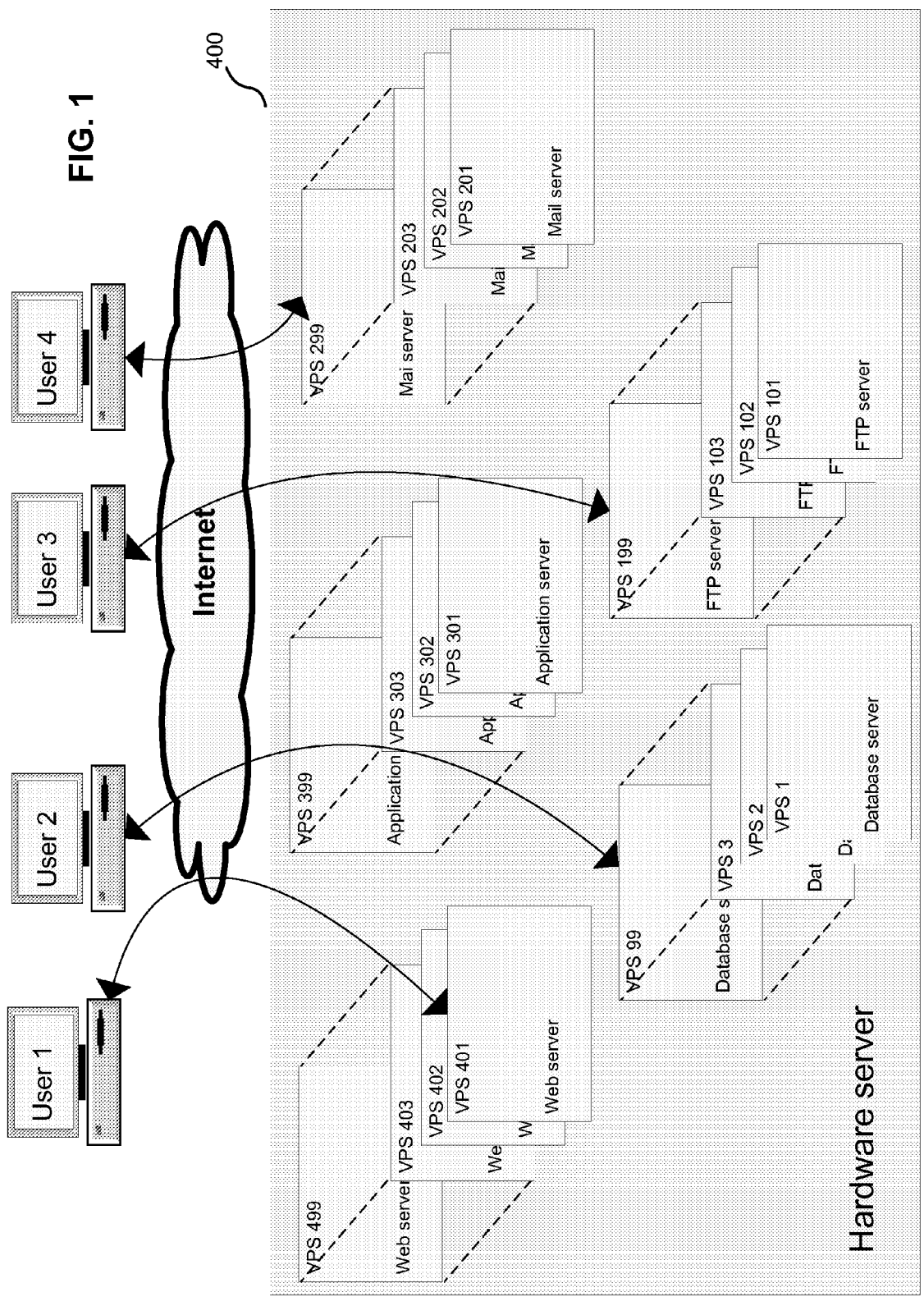
FIG. 1 illustrates a plurality of Virtual Private Servers running on a single hardware "box."

Reference will now be made in detail to the preferred embodiments of the present invention, examples of which are illustrated in the accompanying drawings.

A Virtual Private Server (VPS) is a closed set, or collection, of processes, system resources, users, groups of users, objects and data structures. (One example of the VPS is disclosed in U.S. patent application Ser. No. 10/298,441, entitled BALANCING SHARED SERVERS IN VIRTUAL ENVIRONMENTS, filed on Nov. 18, 2002, which is incorporated herein by reference in its entirety.)

Each VPS has an ID, or some other identifier, that distinguishes it from other VPSs. The VPS offers to its users a service that is functionally substantially equivalent to a stand-alone server with remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and webservers, etc. In other words, the full range of system administrator functions are desirable, as if the VPS were a dedicated remote server, with the existence of the VPS being transparent from the perspective of both the VPS user and the VPS administrator.

Additionally, since server resources may be stored in shareable form, there is no need to dedicate hardware server resources while creating a VPS. The computing resources can be used for creating initial structures that characterize the VPS workspace.

In one embodiment of the VPS the operating system creates a data structure that stores the information corresponding to the VPS, which usually occurs when the VPS itself is created. Some of the information can be stored permanently. For example, in the file system there can be a configuration file for each VPS. The data structure also typically includes a number of parameters used for the functioning of the VPS itself. Preferably, there is a quick way of naming the VPSs, such that searching through the data structure can be accomplished rapidly. This can be a VPS ID, which can be, for example, a number, an alphanumeric string, or similar constructs. Those objects that are unambiguously identified as being associated with a particular VPS typically cannot be re-associated with another VPS, since such a possibility usually suggests a concurrent possibility of a security hole. In other words, a process that is "born" in the context of one VPS cannot live in another VPS.

The launch of multiple VPSs in the same host in such a way permits a high level of hardware server utilization. With effective VPS resource isolation, it is possible to offer a guaranteed level of security and resource availability specified in a service level agreement (SLA).

Thus, a typical application includes a physical computing system or stand-alone computer (usually called a "host") that is configured to run multiple isolated Virtual Private Servers (VPSs). The host includes an operating system (OS) kernel. The kernel runs a number of processes and threads for execution of various system-related processes. The host also includes a number of processes running on the hardware server that correspond to the VPSs, with typically (but not necessarily) at least one user connected to at least one VPS.

The host can include a physical memory, such as a dynamic random access memory (RAM) used by the various processes and threads. The hardware system can also include various storage elements, such as caches, and operating system buffers. The computer system also includes a central processing unit (CPU), or optionally multiple CPUs, whose time can be shared between and among the VPSs. A number of peripheral devices can be included, such as disk storage devices, input/output interfaces, network interfaces, etc. The storage mechanisms, particularly disk storage, can include data files, databases, metadata storage and various other permanently and temporarily stored data objects.

Generally, as used in this description, the operating system kernel has one or more "processes" running within kernel mode. The operating system itself may be viewed as a process. The OS process has its own objects for its own internal use, as well as a number of objects that are representative of the VPSs supported within it.

Each VPS is therefore a set of processes running in user mode and having support from the operating system kernel. Each such VPS typically has a number of OS users and groups, with objects representative of the users associated with the particular VPS. Also, each VPS typically has a number of processes and threads that correspond to, for example, application software being run by a particular OS user.

Each VPS can have its own identifier that allows someone, e.g., an administrator, to locate the VPS via a network interface. The VPS also includes a number of interfaces that permit the users, including the VPS administrator, to access the various services available on the server and on the kernel. A particular case of such services is remote control, sometimes referred to as "server configuration means." Such interfaces include system calls, shared memory interfaces, I/O driver control (ioctls), and similar mechanisms. Each VPS therefore usually has an address, e.g., host name or IP address, by using which a user can establish connections with processes associated with a certain VPS. Each VPS typically includes a number of processes, threads, lightweight processes, and other primitives for servicing the users of that particular VPS. Each VPS also typically has its own objects and data structures that are associated with the processes and threads of that particular VPS. Each VPS may also include a number of objects and data structures utilized by the operating system for control of that VPS.

Normally, the VPSs communicate with the outside world using I/O ports of the computer, which are connected to some sort of network, such as the internet, a LAN, etc. Each such VPS is associated with an IP address, as noted above, which the outside world uses to access that particular VPS.

It should be noted that in the general case, VPS processes and objects may be fully isolated from each other and cannot affect another VPS's process and object, although in some cases, a single VPS can support other VPS's within it. Also, the level of isolation between VPSs can be reduced by the host OS or by additional settings. Also, in some implementation VPSs may have unique for certain VPSs processes and objects as well as shared processes and objects in all VPSs or groups of VPSs.

The VPSs can also be implemented as a software expansion of capabilities of Windows-based servers (i.e., "add-ons"), for example, Microsoft Windows NT servers, Microsoft Windows 2000 servers, Microsoft Windows Server 2003, and various derivatives thereof, by adding the missing isolation mechanisms and VPS resource management mechanisms to the operating system kernels of those operating systems.

The approach described herein uses a "stockpiling" or "caching" or "pre-installing" prefabricated VPSs, that can be created at a time when system load is low. In other words, the processes that result in the creation of a new VPS can be run, for example, at night, or as a background process that consumes limited resources, or in some other manner that affects overall system performance only minimally. Thus, such a stockpile of pre-fabricated, or cached, or pre-installed, VPSs can be almost entirely created before the user requests the creation of a VPS. In other words, disk partitions necessary for that VPS can be created (whether logical or physical), the relevant files can be copied to that disk partition, and all that remains for the user is little more than to configure the VPS in the manner that the user desires.

Typically, the user configures the VPS through some sort of a browser interface, where the user can set up the various parameters of their VPS. Such parameters include URL names, IP addresses, passwords, resource allocations, DNS names, hostnames, various VPS administrative functions (as distinct from the system administrator functions of the web hosting provider), setting up the VPS user password (in other words, the passwords for the users of the VPS, as distinct from the administrator of the VPS, who in turn is a user to the web hosting provider administrator).

The approach described herein is particularly advantageous when VPSs that have isolated components are used, such that when a new VPS is launched, the rest of the virtual environments on that hardware server are only minimally affected, and the time between receiving a request from a user to create a new VPS, and the time that new VPS goes "live" is short. In other words, the approach described herein is applicable both to VPSs (or, more broadly, virtual environments) with fully isolated components, and to VPSs with shared components and combination thereof. SWsoft Virtuozzo™-like technologies, as well as Virtual Machine Technologies such as the Xen project, Microsoft Virtual PC, VMware Workstation and others may be chosen as a platform for implementing the invention. Systems with hardware support (e.g., Intel VT or AMD Pacifica platforms) or without hardware support of virtualization technologies may be used as well.

One example of using an approach is virtualization means that use virtual machines with fully isolated components. In this case, a lot of time and computer resources required for installing new virtual environment, e.g., for creating virtual partition corresponding to virtual server and installing required software components inside a partition, can be avoided.

In should be noted that VPSs described below are only particular examples of how the invention can be implemented.

FIG. 1 illustrates an exemplary arrangement of a hardware server with multiple VPSs, virtual environments running thereon. As shown in FIG. 1, such a hardware server 400 can have different types of VPSs running on it, typically serving a particular purpose. For example, some of the VPSs may be dedicated as database servers, some of the VPSs may be dedicated as FTP servers, or as application servers, as mail servers, or as web servers. It will be appreciated that the number of such VPSs need not be the same, but may be more or fewer (or even none) of each type. Also, the number of VPSs on any particular hardware server 400 may be only a handful, or may be as many as thousands, depending on the particular load that the VPSs are experiencing. Furthermore, the hardware server 400, here shown as a single "box" may also be a cluster, such as, for example, a virtual server farm (which is multiple computers tied together into a single entity.

As further shown in FIG. 1, the VPSs of the hardware server 400 connect, through various I/O mechanisms, to their particular users, through the internet or some other network means. The users can be anonymous users, such as those accessing a web page anonymously, through a browser. These users can also be authorized users, such as users that log in to a particular VPS (for example, into a mail server) using a user name and password. The users can also be administrators or others with admin-level privileges.

Figure 2:
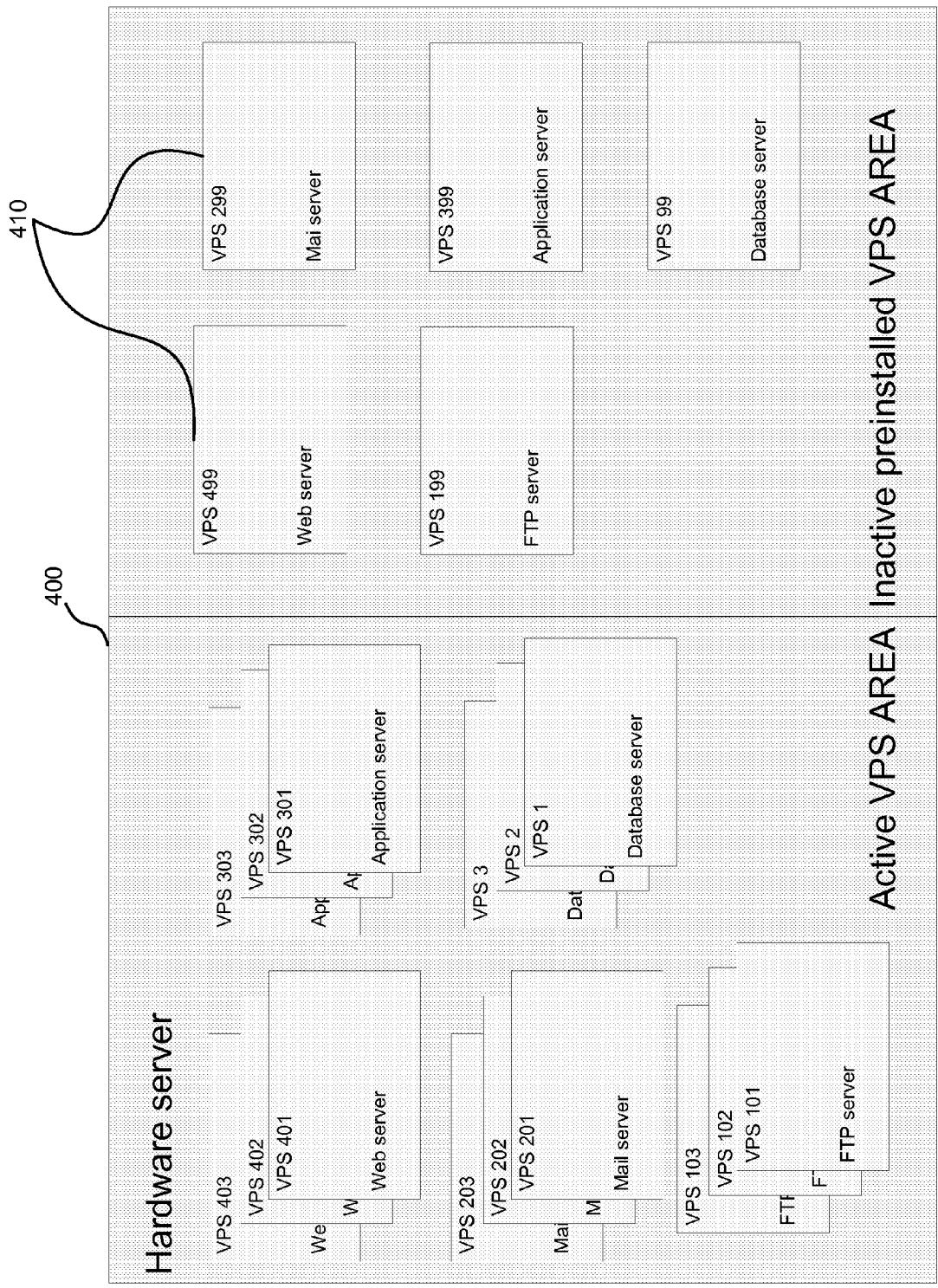
FIG. 2 illustrates an exemplary embodiment of the invention, showing an active VPS area, and an inactive area, where the "pre-fabricated," or pre-installed VPSs are "stored."

FIG. 2 illustrates an exemplary embodiment of the invention, showing an active VPS area, and an inactive area, where the "pre-fabricated," or pre-installed VPSs are "stored."

A preinstalled VPS contains partition image with data required for VPS functioning in an active state, e.g., preinstalled operating system files and/or links to a template area that contains standard OS files. In a preferred embodiment, the partition image is enclosed in a container, as discussed further below.

Figure 5:
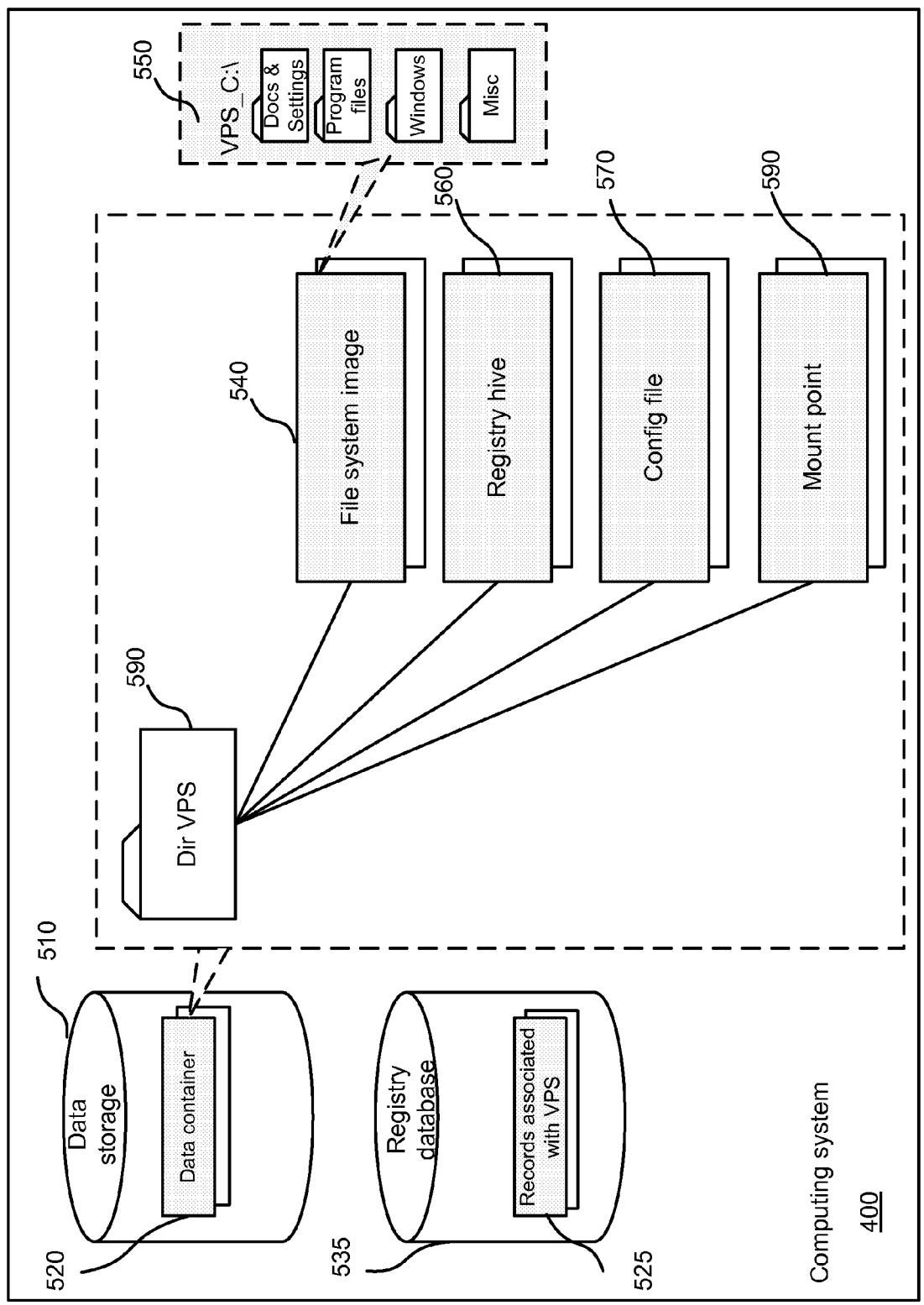
FIG. 5 illustrates an exemplary embodiment of data container organization.

As shown in FIG. 5, computing system 400, configured to support VPSs, contains data storage 510 that stores one or more data containers 520, each such corresponding to inactive VPS. Along with data container 520, computing system 400 may contain records 525 outside the container 520, where the records 525 are associated with the VPS, and may be organized in registry database 535. Registry database 535 may be unique or common for several VPSs and supports simultaneous execution of processes of different VPS.

The container defines a data structure, adapted for efficient use of server virtualization means. Different kinds of containers correspond to different virtualization means and are specialized or dedicated to certain tasks. For example, data may be stored in form of an image 550 of a partition corresponding to the VPS, where the image 550 may consist of meaningful data (e.g., copies of private VPS data), reference data (e.g., stubs or links to shared structures), and service data or metadata (e.g., a standardized list of files). Service data or metadata, correspond to server virtualization means and are required for correct utilization of the container. For example, the container may be a collection of archived data, or data itself, that defines a separate partition, but is stored in other partition.

One example of the container shown in FIG. 5 includes file system image 540 of the partition 550 that contains system folders, application and user data. Also, the container can include registry hives 560, config files 570 and mount points 580, required for activating, starting and proper functioning VPS, including blank areas, filled in while configuration of activated VPS implemented by user or system administrator. On the top of data stored in the container, file system structures 590 can be placed.

In another embodiment, the partition image may contain additional structures, formed in the process of creating the inactive VPS, e.g., access lists, private area, registry hives and so on. Also for supporting VPS functioning service structures outside the container may be required. Such a structure can be a registry database that stores a hierarchical set of keys that determine how virtual machine operates. Over partition, image file system structures are placed to provide full functionality of the VPS in supporting environment, such as described in U.S. patent application Ser. No. 10/691,066, entitled SYSTEM AND METHOD FOR PROVIDING EFFECTIVE FILE-SHARING IN A COMPUTER SYSTEM TO ALLOW CONCURRENT MULTI-USER ACCESS, which is incorporated herein by reference in its entirety. Preferably such a file system is a copy-on-write file system, e.g., mini_fo file system (see http://lwn.net/Articles/135283/), private part of VZFS file system such as disclosed in the U.S. patent application Ser. No. 10/401,636, entitled SYSTEM AND METHOD FOR PROVIDING EFFECTIVE FILE-SHARING IN A COMPUTER SYSTEM TO ALLOW CONCURRENT MULTI-USER ACCESS, filed on Mar. 27, 2003, U.S. patent application Ser. No. 10/729,365, entitled SYSTEM, METHOD AND COMPUTER PROGRAM PRODUCT FOR MULTI-LEVEL FILE-SHARING BY CONCURRENT USERS, filed on Dec. 8, 2003, U.S. patent application Ser. No. 10/691,066, entitled SYSTEM AND METHOD FOR PROVIDING EFFECTIVE FILE-SHARING IN A COMPUTER SYSTEM TO ALLOW CONCURRENT MULTI-USER ACCESS, filed Oct. 21, 2003, which are all incorporated herein by reference in their entirety), the content of the virtual machine image file, necessary for providing virtual machine functionality or the like. File system structures provide VPS functionality in an active state and may support modification of the template (or shared) areas as if it were a private area.

As shown in FIG. 2, the active VPSs function in the same manner as the VPSs in FIG. 1. The inactive VPSs are set up, except for various minor customization issues. In other words, the VPSs in the inactive area have all the disk partitions set up, their files copied to the appropriate areas, etc. Upon a request from a user to activate another VPS (in other words, for example, a new user wants to start a VPS that manages a brand new web site), the VPS can then be moved from the inactive area to the active area. In practical terms, that VPS is assigned an ID that identifies that VPS as active, the VPS is configured properly by the hosting provider, the passwords and user accounts are set up, etc. Furthermore, the customization process may also involve installation of non-standard user applications.

As noted above, such a process does not consume much time at all, and the VPS can be activated in a fraction of a second. This compares with trying to activate a VPS "from scratch," which involves copying several gigabytes worth of data to a partition associated with the new VPS.

Furthermore, the pre-installed VPSs in the inactive area can be of multiple types, for example, corresponding to not just the type of function that the VPS performs (i.e., FTP server, mail server, web server, etc.), but also corresponding to different operating systems, different versions of the operating systems, different patching versions, different sets of user applications installed in each one, etc.

Figure 3:
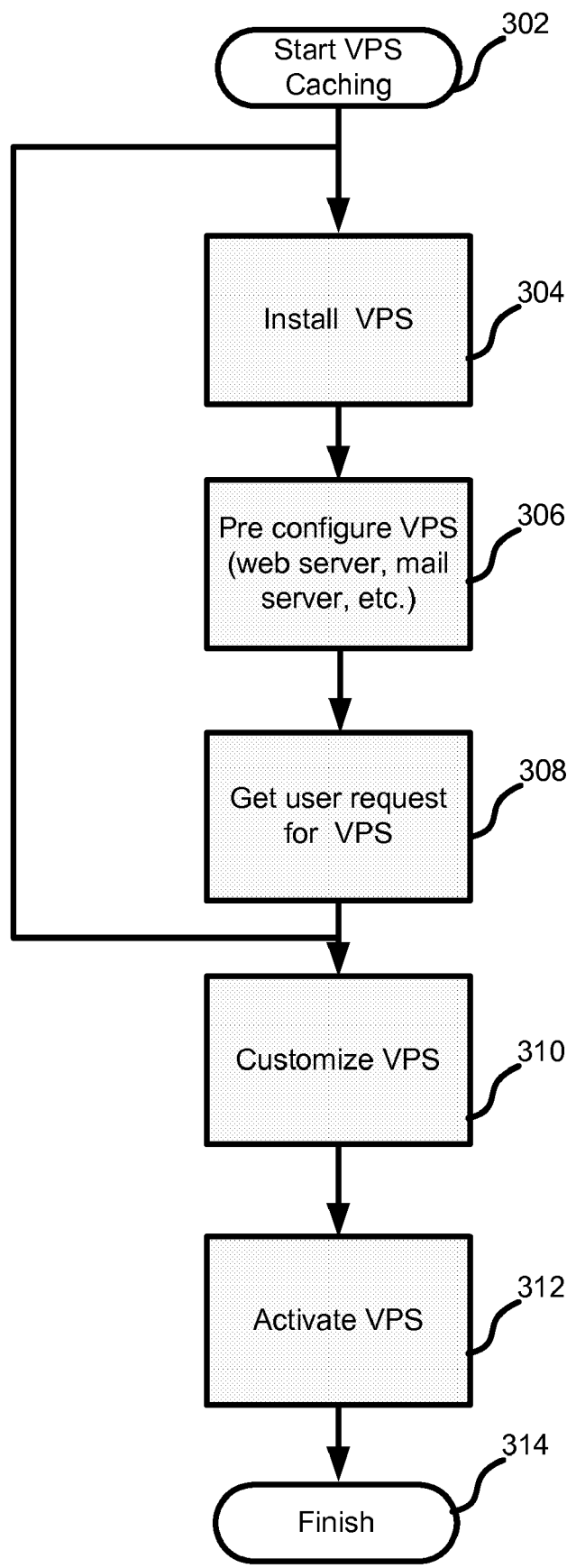
FIG. 3 illustrates in flowchart form the process of caching, or pre-installing, VPSs.

FIG. 3 illustrates in flowchart form the process of caching, or pre-installing, VPSs according to one embodiment of the present invention. As shown in FIG. 3, the VPS stockpiling, or pre-installation, or caching process is started in step 302. The first VPS is pre-installed on the hardware server 400, as described above—in other words, the proper disk partitions are created, the files are copied, the identifiers loaded, etc. (step 304). The VPS is then pre-configured appropriately, as necessary (in other words, as a mail server, a database server, a web server, FTP server, etc.) (step 306). A request from the user might then come in to activate a VPS (step 308). In that case, one of the pre-installed VPSs is customized according to the user's requirements—passwords and log-ins are set up, VPS identifiers are loaded into memory, admin rights are granted to the right users, etc. (step 310). The VPS can then be activated (step 312). The process can then finish (step 314), or alternatively, can continue caching new pre-installed VPSs, up to some limit defined by the system administrator. Furthermore, the process of creating pre-installed VPSs can continue in the background, after step 308, as shown in FIG. 3.

Figure 4:
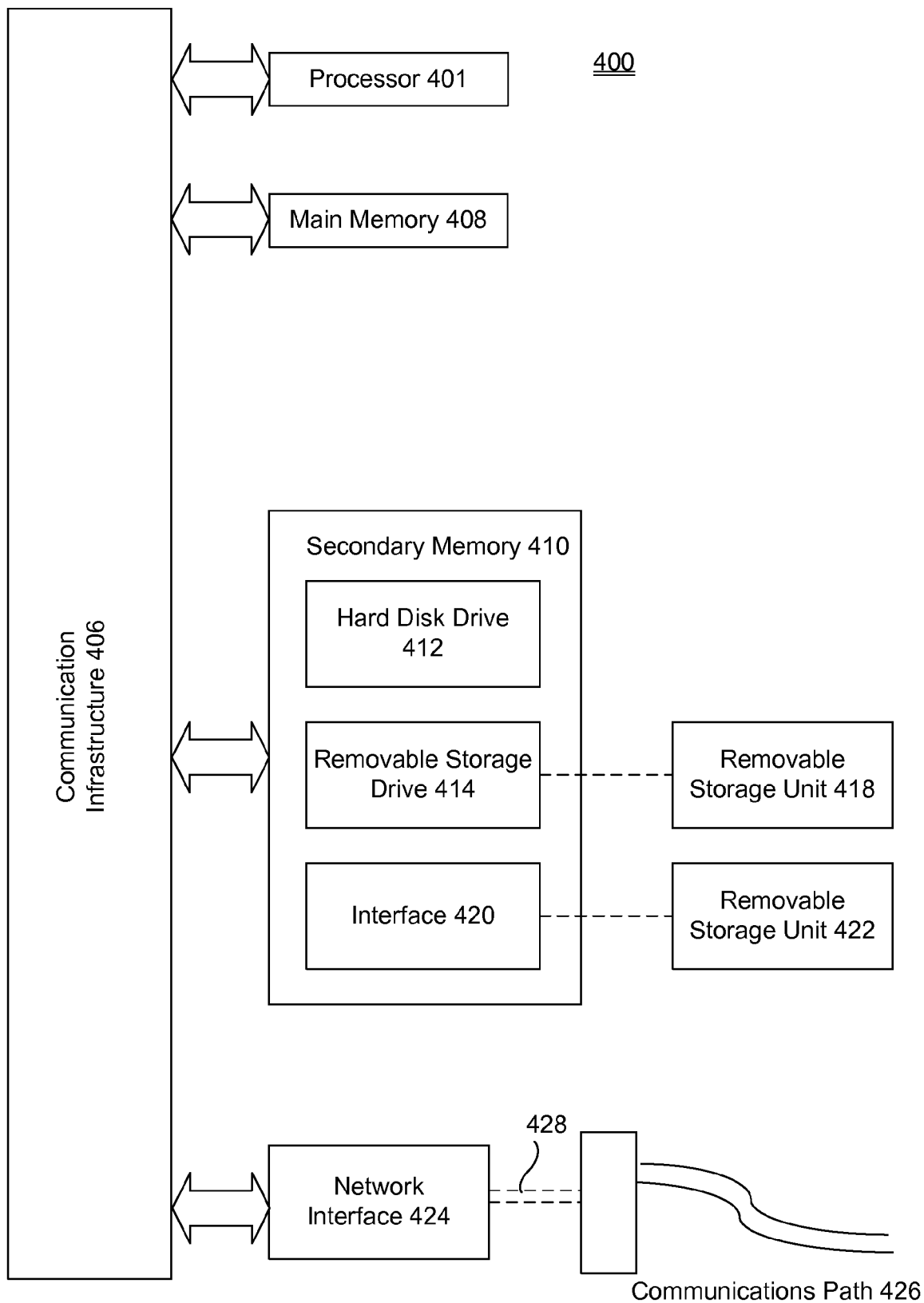
FIG. 4 is a schematic diagram of an exemplary computer or server that may be used in the invention.

An example of the server 400 is illustrated in FIG. 4. The server 400 includes one or more processors, such as processor 401. The processor 401 is connected to a communication infrastructure 406, such as a bus or network. Various software implementations are described in terms of this exemplary computer system. After reading this description, it will become apparent to a person skilled in the relevant art how to implement the invention using other computer systems and/or computer architectures.

Server 400 also includes a main memory 408, preferably random access memory (RAM), and may also include a secondary memory 410. The secondary memory 410 may include, for example, a hard disk drive 412 and/or a removable storage drive 414, representing a magnetic tape drive, an optical disk drive, etc. The removable storage drive 414 reads from and/or writes to a removable storage unit 418 in a well known manner. Removable storage unit 418 represents a magnetic tape, optical disk, or other storage medium that is READ by and written to by removable storage drive 414. As will be appreciated, the removable storage unit 418 can include a computer usable storage medium having stored therein computer software and/or data.

In alternative implementations, secondary memory 410 may include other means for allowing computer programs or other instructions to be loaded into server 400. Such means may include, for example, a removable storage unit 422 and an interface 420. An example of such means may include a removable memory chip (such as an EPROM, or PROM) and associated socket, or other removable storage units 422 and interfaces 420 which allow software and data to be transferred from the removable storage unit 422 to server 400.

Server 400 may also include one or more communications interfaces, such as communications interface 424. Communications interface 424 allows software and data to be transferred between server 400 and external devices. Examples of communications interface 424 may include a modem, a network interface (such as an Ethernet card), a communications port, a PCMCIA slot and card, etc. Software and data transferred via communications interface 424 are in the form of signals 428 which may be electronic, electromagnetic, optical or other signals capable of being received by communications interface 424. These signals 428 are provided to communications interface 424 via a communications path (i.e., channel) 426. This channel 426 carries signals 428 and may be implemented using wire or cable, fiber optics, an RF link and other communications channels. In an embodiment of the invention, signals 428 comprise data packets sent to processor 401. Information representing processed packets can also be sent in the form of signals 428 from processor 401 through communications path 426.

The terms "computer program medium" and "computer usable medium" are used to generally refer to media such as removable storage units 418 and 422, a hard disk installed in hard disk drive 412, and signals 428, which provide software to the server 400.

Computer programs are stored in main memory 408 and/or secondary memory 410. Computer programs may also be received via communications interface 424. Such computer programs, when executed, enable the server 400 to implement the present invention as discussed herein. In particular, the computer programs, when executed, enable the processor 401 to implement the present invention. Where the invention is implemented using software, the software may be stored in a computer program product and loaded into server 400 using removable storage drive 414, hard drive 412 or communications interface 424.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for managing virtual servers, the method comprising:

launching a plurality of active virtual servers in a computing system, wherein the virtual servers share services of the same host operating system and virtualize the host operating system;

as a background process, generating a plurality of inactive virtual servers, wherein data related to the inactive virtual server comprises a set of private files and a set of common files shared by multiple virtual servers, that are required for the virtual server to function and each of which is stored in its own dedicated container;

setting up a disk image and a mount point associated with a particular virtual server, the mount point required for activating a functional virtual server, the disk image including any blank areas, implemented by a system administrator during activation of the virtual server, for each inactive virtual server on a storage device of the computing system, and copying files associated with each inactive virtual server to the disk image, wherein the inactive virtual servers are not associated with any owner;

upon request from a user for a virtual server, activating one of the inactive virtual servers using the dedicated container by associating the activated virtual server with an owner; and configuring the activated virtual server based on any of URL names, IP addresses, passwords, resource allocations, DNS names, hostnames, virtual server administrative functions, and virtual server user password, wherein a process of one virtual server only runs in that virtual server, and no other virtual server.

2. The method of claim 1, wherein the virtual server is a Virtual Private Server.

3. The method of claim 1, wherein the dedicated container is a part of one or more files which represent a block level image of the image and related data with file system on the top of block level image.

4. The method of claim 3, wherein the image includes system files of the host operating system.

5. The method of claim 1, wherein the dedicated container includes a private area of a copy-on-write file system.

6. The method of claim 1, wherein the generating step comprises generating a plurality of inactive virtual servers of any of mail server, web server, database server, FTP server, and game server.

7. The method of claim 1, further comprising generating inactive virtual servers of a specified configuration, if number of inactive virtual servers of the specified configuration falls below a predefined value.

8. The method of claim 1, further comprising generating inactive virtual servers that have shared components with other virtual servers.

9. A system for managing virtual servers, the system comprising:

a plurality of active virtual servers running on a computing system, wherein the virtual servers share services of the same host operating system and virtualize the host operating system;

a plurality of inactive virtual servers generated using a background process, wherein data related to the inactive virtual server comprises a set of private files and a set of common files shared by multiple virtual servers, that are required for the virtual server to function and each of which is stored in its own dedicated container;

for each virtual server, a disk image and a mount point associated with a particular virtual server, the mount point required for activating a functional virtual server, the disk image including any blank areas, implemented by a system administrator during activation of the virtual server, for each inactive virtual server on a storage device of the computing system, and copying files associated with each inactive virtual server to the disk image, wherein the inactive virtual servers are not associated with any owner;

upon request from a user for a virtual server, means for activating one of the inactive virtual servers using the dedicated container by associating the activated virtual server with an owner; and wherein the activated virtual server is configured based on any of URL names, IP addresses, passwords, resource allocations, DNS names, hostnames, virtual server administrative functions, and virtual server user password, wherein a process of one virtual server only runs in that virtual server, and no other virtual server.

10. The system of claim 9, wherein the generating step comprises generating a plurality of inactive virtual servers of any of mail server, web server, database server, FTP server, and game server.

11. The system of claim 9, wherein, when a number of inactive virtual servers of a specified configuration falls below a predefined value, additional inactive virtual servers of the specified continuation are generated.

12. The system of claim 9, wherein the inactive virtual servers have shared components with other virtual servers.

13. The method of claim 9, wherein the inactive virtual servers have fully isolated components.

14. A computer program product for managing virtual servers, the computer program product comprising a non-transitory computer useable recording medium having computer program logic recorded thereon for performing the steps of claim 1.

* * * * *